(12) United States Patent
Janasek et al.

(10) Patent No.: US 6,435,049 B1
(45) Date of Patent: Aug. 20, 2002

(54) TRANSMISSION SHIFT CONTROL METHOD

(75) Inventors: Clayton George Janasek, Independence; Russell Dee Taylor, Manhattan, both of KS (US); Richard Marvin Sparks, Bartlesville, OK (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/505,001

(22) Filed: Feb. 15, 2000

(51) Int. Cl.[7] .................. F16H 59/00; F16H 61/00; F16H 63/00
(52) U.S. Cl. .................. 74/335; 74/336 R; 477/143
(58) Field of Search .................. 74/325, 335, 336 R, 74/337; 477/143

(56) References Cited

U.S. PATENT DOCUMENTS

| | | | |
|---|---|---|---|
| 4,422,536 A | 12/1983 | Shatuck | 192/3.57 |
| 5,012,416 A | 4/1991 | Bulgrien et al. | 364/424.1 |
| 5,212,998 A | 5/1993 | Testerman | 74/335 |
| 5,337,871 A | 8/1994 | Testerman | 192/85 |
| 5,449,329 A | 9/1995 | Brandon et al. | 477/70 |
| 5,580,332 A | * 12/1996 | Mitchell et al. | 477/143 |
| 5,609,067 A | * 3/1997 | Mitchell et al. | 74/336 R |
| 5,839,989 A | * 11/1998 | Saito et al. | 477/143 |
| 6,002,976 A | 12/1999 | Hollstein et al. | 701/51 |
| 6,190,280 B1 | * 2/2001 | Horsch | 475/209 |

* cited by examiner

*Primary Examiner*—Charles A Marmor
*Assistant Examiner*—Tisha D. Lewis

(57) ABSTRACT

A method of controlling, in response to a shift command, a commanded shift of a powershift transmission of an engine-driven vehicle includes monitoring speeds transmission component selected according to the commanded shift and monitoring a speed ratio therefrom. If the input section will speed up during the commanded shift, the speed clutches are swapped, and then the output clutches are swapped when the monitored speed ratio matches a stored speed ratio. Also, the input speed of an input shaft of the transmission is monitored, and the pressure of the off-going output clutch is controlled to limit the deceleration of the input shaft speed to desired limits. If the input section will slow down during the commanded shift, the output clutches are swapped, and then the speed clutches are swapped when a monitored speed ratio matches a stored speed ratio. If a particular shift requires swapping of only speed clutches, then a speed ratio is monitored for the pair of the speed clutches to be swapped. If the input section will speed up or slow down during the commanded shift, the pair of speed clutches are swapped, and the monitored speed ratio is compared to a predetermined stored speed ratio value to determine when swapping of the speed clutches is completed, and after the speed clutches are swapped, one of the output clutches is fully pressurized to complete the shift.

4 Claims, 8 Drawing Sheets

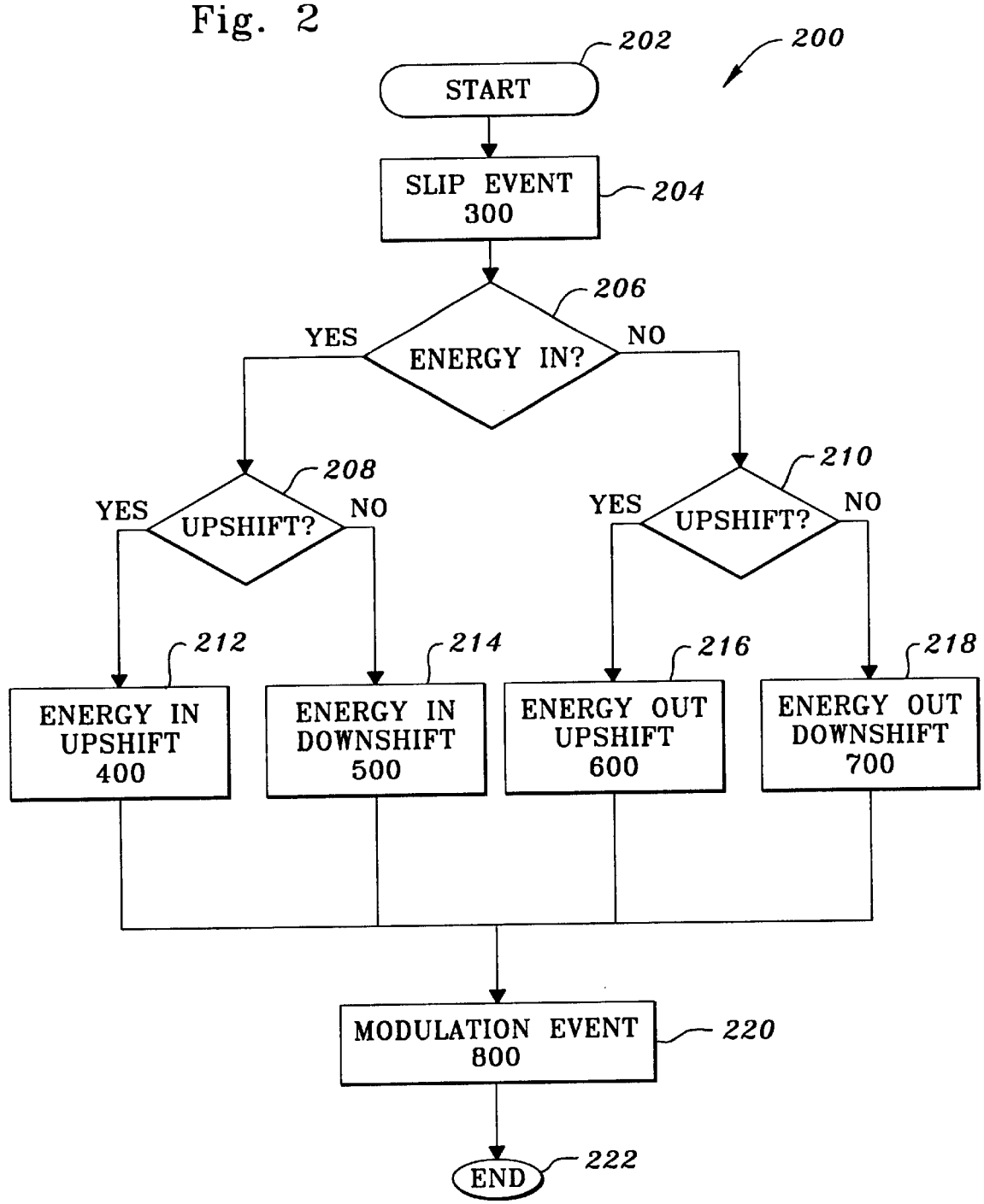

TRANSMISSION SHIFT CONTROL METHOD

BACKGROUND OF THE INVENTION

The invention relates to a vehicle transmission shift control system, and more particularly, to a clutch slip-based powershift transmission shift control system.

Modern vehicle powershift transmissions, such as the AG250 powershift transmission manufactured by Funk Manufacturing, or such as described in U.S. Pat. No. 5,557,978, issued Sep. 24, 1996 to McAskill, and assigned to the assignee of this Application, contain multiple electronically controlled, hydraulically actuated wet clutches. Such clutches direct the flow of power through the transmission, and the control of such clutches permits selection of different gear ratios. Conventional shifting control of these types of transmissions involve fixed timing of the clutch solenoid valve current values based solely on a signal representing engine load recorded at the beginning of a shift. Specifically, each clutch involved during a particular shift has its own engagement or disengagement function to perform according to this load signal. For this type of control scheme to function properly, each clutch engagement and disengagement path for each shift must be mapped out according to the load signal. This can result in many iterations, because often a certain set of clutch paths has to be resolved before another can be resolved. To add to the confusion, the clutches will often interact with one another (especially in a dynamic slip condition) thus making it very difficult and time consuming to find the optimum engagement or disengagement path for every clutch in a particular shift across the engine load spectrum.

Using the engine load signal itself to determine clutch operation has a few shortcomings. First, the engine load signal varies significantly. If clutch engagement and disengagement paths are based solely on an engine load signal, inconsistency in the feel of the shifting can be expected, because clutch engagement pressure steps will change accordingly. Secondly, using only the engine load signal to determine clutch engagement and disengagement paths can be misleading. For example, in agricultural tractor applications, there are situations where engine load does not correspond to actual load at the particular output clutch in the transmission. In such situations, the engine's primary use is to power auxiliary or external mechanisms through either a power-take-off (PTO) or a hydraulic pump. Regardless, the transmission output clutch does not see this load. The engine load signal to the transmission continues to supply a signal representing the load, and such a load signal cannot distinguish between an auxiliary load and an engine load relating to transmission load. Therefore, if the vehicle itself is lightly loaded by draft force yet the engine is heavily loaded by an auxiliary function, then clutch operation will be what would be appropriate for a heavy draft load condition, resulting in a very aggressive shift and transmission of the shift shock to the operator. This will be perceived by an operator as a bad shift.

SUMMARY OF THE INVENTION

Accordingly, an object of this invention is to provide a powershift transmission control system which produces smooth shifts regardless of what particular shift is commanded.

Another object of this invention is to provide such a powershift transmission control system which controls the order in which clutch pairs are swapped depending upon whether the input speed of the transmission will speed up or slow down.

Another object of this invention is to provide such a powershift transmission control system wherein the last clutches to be swapped are swapped when the monitored speed ratio matches a stored speed ratio.

These and other objects are achieved by the present invention for a method of controlling, in response to a shift command, a commanded shift of a powershift transmission of an engine-driven vehicle. The transmission has an input shaft, an input section and fluid pressure operated clutches for controlling flow of torque through the transmission. The transmission includes output clutches and speed clutches between the output clutches and the input-shaft. According to the present invention, the method includes monitoring a speed of a first component of the transmission, monitoring a speed of a second component of the transmission, the first and second components being selected according to the commanded shift and monitoring a speed ratio of the speed of the first component to the speed of the second component. If the input section will speed up during the commanded shift, the speed clutches are swapped, and then the output clutches are swapped when the monitored speed ratio matches a stored speed ratio. Also, input speed of an input shaft of the transmission is monitored, and the pressure of the off-going output clutch is controlled to limit the deceleration of the input shaft speed to desired limits. If the input section will slow down during the commanded shift, the output clutches are swapped, and then the speed clutches are swapped when a monitored speed ratio matches a stored speed ratio. If a particular shift requires swapping of only speed clutches, then a speed ratio is monitored for the pair of the speed clutches to be swapped. If the input section will speed up or slow down during the commanded shift, the pair of speed clutches are swapped, and the monitored speed ratio is compared to a predetermined stored speed ratio value to determine when swapping of the speed clutches is completed, and after the speed clutches are swapped, one of the output clutches is fully pressurized to complete the shift.

BRIEF DESCRIPTION OF THE DRAWINGS

FIGS. 2–9 are logic flow diagrams of the algorithm executed by the transmission controller of FIG. 1.

DETAILED DESCRIPTION

This application includes a microfiche appendix including one microfiche and 35 frames. A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

Figure 1B:
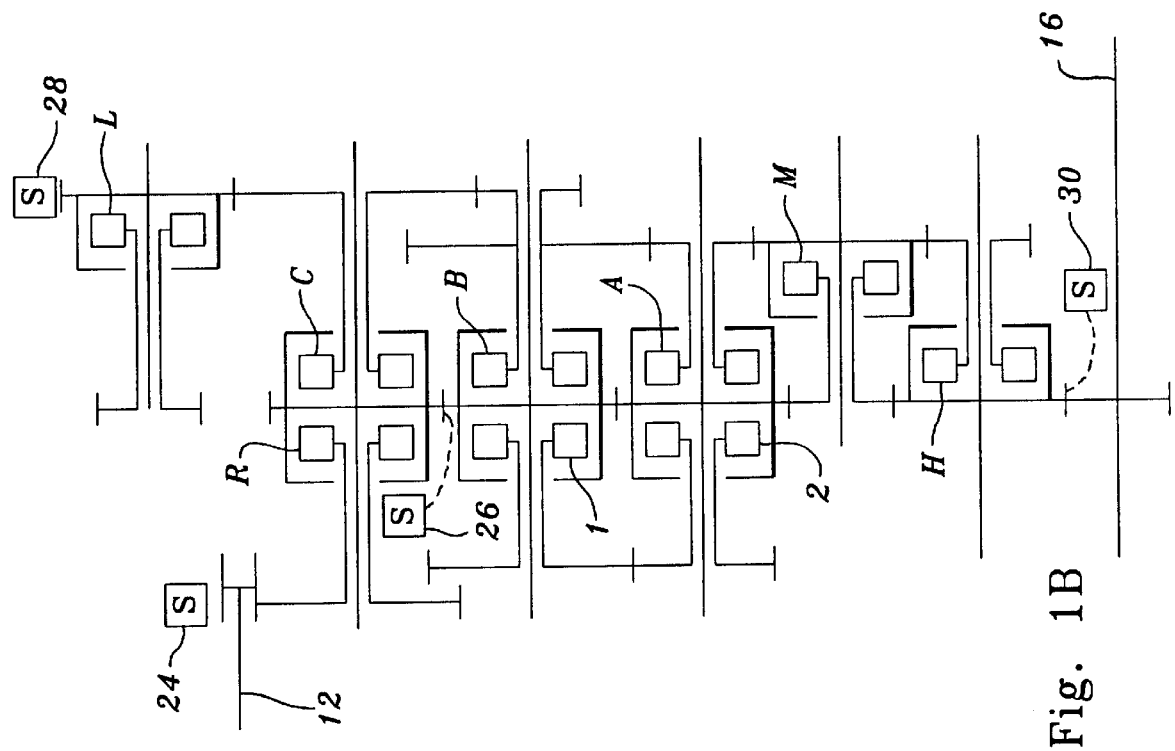
FIG. 1B is a schematic diagram of an example of a transmission to which the present invention is applicable.
Figure 1A:
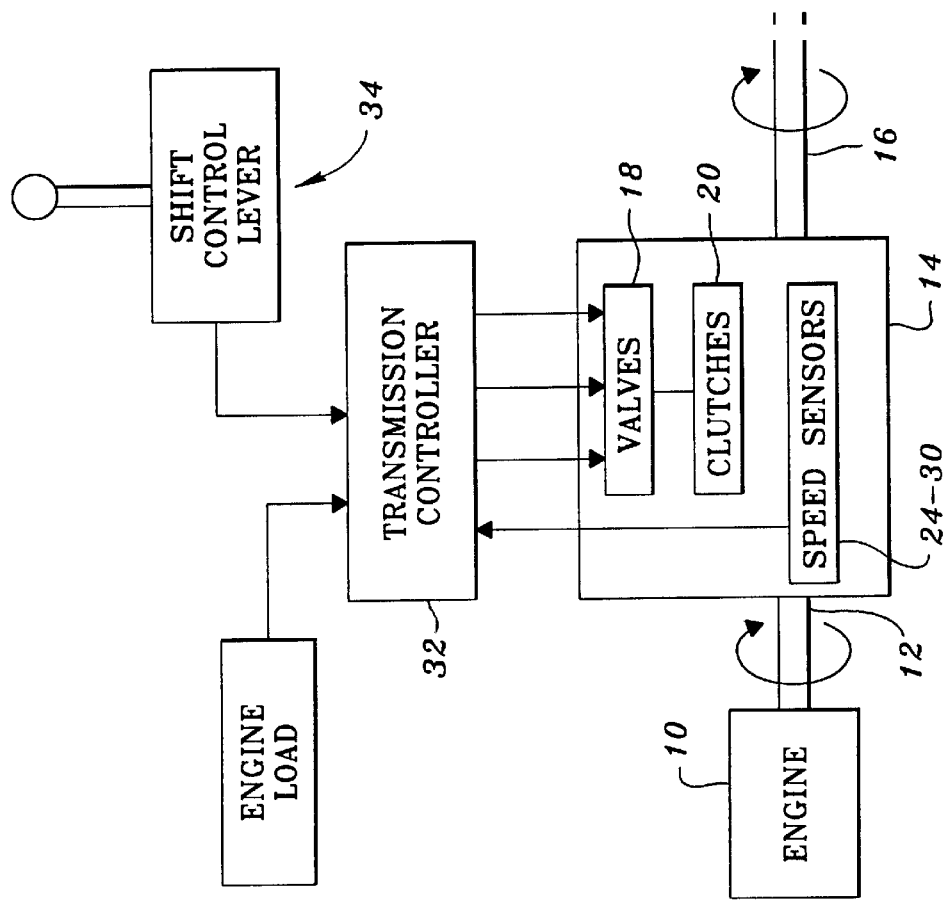
FIG. 1A is a schematic diagram of a transmission control system to which the present invention is applicable.
Figure 3:
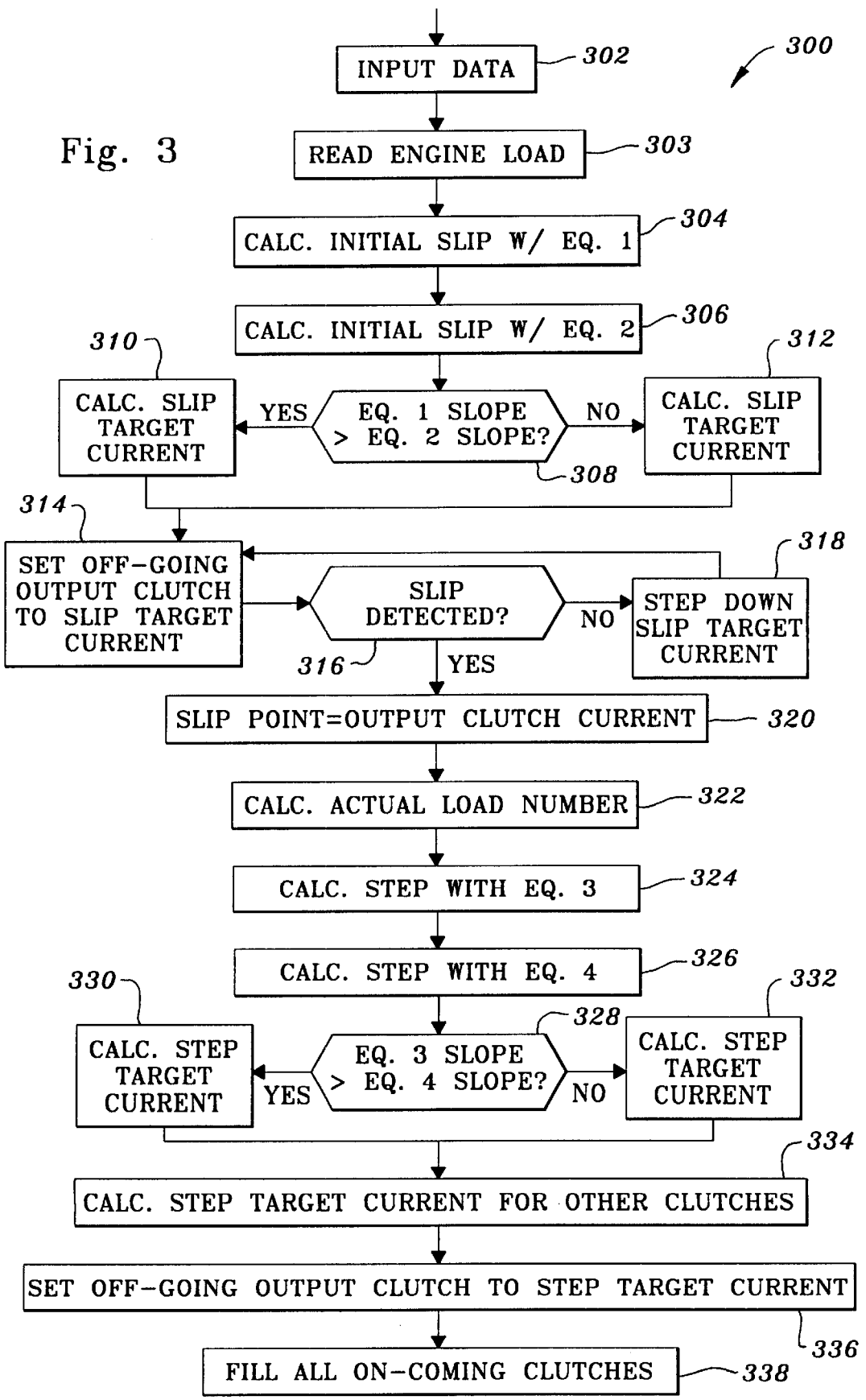

Referring to FIG. 1A, a vehicle power train includes an engine 10 with an output shaft 12 which drives a power shift transmission (PST) 14. The PST 14 drives an output shaft 16 which is connected to vehicle drive wheels (not shown). The PST 14 includes a plurality of clutch control valves 18 which control a plurality of clutches 20, which in turn control the shifting of the PST 14. The PST 14 also includes a plurality of speed sensor 24–30.

Referring to FIG. 1B, the PST 14 includes directional clutches 1, 2 and R, speed clutches A, B and C, and output (or range) clutches L, M and H (which are connected directly or indirectly through constantly meshed gears to the transmission output shaft 18). The speed clutches are between the output clutches and the transmission input shaft 12. An input section of the transmission 14 includes the shafts thereof, the speed of which is determined by the engagement status of the directional and speed clutches. The clutch control valves 18 are preferably electro-hydraulic valves which provide a pressure substantially proportional to the duty cycle of an electrical valve current signal applied to an input thereof, such as are part of the AG250 powershift transmission manufactured by Funk Manufacturing, or any similar valve.

A first speed sensor 24 is located on the $1^{st}$ Stage gear in order to sense the speed of the input (first stage) shaft 12. A second speed sensor 26 is located to sense the speed of a $3^{rd}$ stage shaft. A third speed sensor 28 is located to sense the speed of a $5^{th}$ stage shaft. A fourth speed sensor 30 is located to sense the speed of a $6^{th}$ stage shaft and of output ($8^{th}$ stage) shaft 16.

The PST 14 is controlled by a transmission controller 32 which receives signals from an operator controlled shift lever unit 34, and from speed sensors 24–30. The transmission controller 32 also receives an actual Engine Load signal from an electronic engine controller (not shown). The transmission controller 32 is preferably a microprocessor-based control unit, such as is provided with the AG250 powershift transmission manufactured by Funk Manufacturing, or a similar microprocessor-based electronic control unit. The transmission controller 32 executes a control algorithm, and according to the present invention, executes a control subroutine such as illustrated by the logic flow charts set forth in FIGS. 2–9, and as more fully illustrated by the program listing included in the microfiche appendix.

Referring to FIG. 2, there is shown a simplified representation of the master algorithm 200. After starting at step 202, step 204 calls routine 300, the main functions of which include determining a load value for use elsewhere in the algorithm to determine shift operation, determining whether the shift to be made is a "energy in" or "energy out" shift, and determining target currents for the various clutches involved in the shift to be performed. Steps 206–218 operate to cause execution of the appropriate one of routines 400, 500, 600 or 700, depending upon whether the shift to be made is a "energy in" or "energy out" shift and upon whether it is an upshift or a downshift. Then, each of routines 400, 500, 600 or 700 controls the current of the off-going output clutch, controls clutch swapping, controls the current of the on-coming output clutch and turn off the off-going output clutch. Finally, routine 800 controls the current of the on-coming output clutch to complete the shift.

The slip event routine 300 is shown in more detail in FIGS. 3A and 3B. The following algorithm description will apply to a shift such as from $5^{th}$ to $6^{th}$ gear, wherein clutch 2 stays on, clutches A and M go off and a clutches B and L clutch go on, but this description would also apply to other similar shifts of the PST 14 (clutch 2 stays on all the time).

In step 302, in response to a command to shift from $5^{th}$ to $6^{th}$ gear, various stored numerical values, data and parameters, specific to the PST 14 and the shift to be performed, are retrieved from a data file stored in memory.

In step 303 the actual engine load is read from a signal generated by an engine controller (not shown).

Based upon the engine load signal, step 304 calculates a parasitic-influenced initial estimated valve current value, $Slip_{Low}$, corresponding to a pressure at which the clutch M would be expected to begin to slip using the following equation:

$$Slip_{Low}=((Slip_2-Slip_1)/(Engine_2-Engine_1))\times EngineLoadNumber+ (Slip_2-((Slip_2-Slip_1)/(Engine_2-Engine_1)\times Engine_2)), \quad (1)$$

where $Slip_1$ is an empirically determined stored valve current value corresponding to a clutch pressure at which an unloaded clutch M would begin to slip, $Slip_2$ is an empirically determined stored valve current value corresponding to a clutch pressure at which a partially loaded clutch M would begin to slip, $Engine_1$ is an empirically determined, stored value corresponding to the engine load which exists at time unloaded L clutch slips, $Engine_2$ is an empirically determined, stored value corresponding to the engine load which exists at the time partially loaded clutch M slips, and EngineLoadNumber is the actual engine load read by step 303 at the time a shift is commanded. This, $Slip_{Low}$ is a first initial clutch slip pressure value representative of a pressure at which said clutch is expected to slip according to a first equation representing a clutch slip characteristic when parasitic loads on the transmission are significant, such as when the vehicle is not pulling a load such as a plow.

Then, step 306 will then calculate a non parasitic-influenced initial estimated valve current value, $Slip_{High}$, corresponding to a pressure at which the clutch would be expected to begin to slip using the following equation:

$$Slip_{High}=((Slip_3-Slip_2)/(Engine_3-Engine_2))\times EngineLoadNumber+ (Slip_3-((Slip_3-Slip_2)/(Engine_3-Engine_2)\times Engine_3)), \quad (2)$$

where $Slip_2$ is an empirically determined stored valve current value corresponding to a clutch pressure at which a partially loaded clutch M would begin to slip, $Slip_3$ is an empirically determined stored valve current value corresponding to a clutch pressure at which a fully loaded clutch M would begin to slip, $Engine_2$ is an empirically determined, stored value corresponding to the engine load which exists at time partially loaded clutch M slips, $Engine_3$ is an empirically determined, stored value corresponding to the engine load which exists at the time fully loaded clutch M slips, and EngineLoadNumber is the actual engine load read by step 303 at the time a shift is commanded. Thus, $Slip_{High}$ is a second initial clutch slip pressure representative of a pressure at which said clutch is expected to slip according to a second equation representing a clutch slip characteristic when parasitic loads on the transmission are insignificant, such as when the vehicle is pulling a plow.

Step 308 compares the slopes of the two previously described linear equations which map expected off-going clutch M slip pressure value vs. engine load signal. If the slope of Eqn. (1) is greater than the slope of Eqn. (2), then in step 310, then the lower of $Slip_{Low}$ or $Slip_{High}$ is chosen as the initial estimated valve current value, Slip, at which clutch M is expected to slip (plus some margin for error). If the slope of Eqn. (1) is less than the slope of Eqn. (2), then in step 312, then the higher of $Slip_{Low}$ or $Slip_{High}$ is chosen as the initial estimated valve current value, Slip, at which clutch M is expected to slip (plus some margin for error). The intersection of these two equations could be defined as the point at which parasitic transmission torque loads are no longer significant compared to torque loads created by external operating conditions such as draft. Equation 1 describes clutch M slip characteristics in the parasitic region while Equation 2 describes clutch M slip characteristics in the lightly to fully loaded region.

Then, step 314 applies the valve current value Slip (calculated in either steps 310 or 312) to the control valve for the off-going clutch M, and the pressure in the clutch M is adjusted accordingly.

Next, step 316 detects slippage of clutch M by calculating a slip speed ratio representing a ratio of output speed (from sensor 30) divided by input speed (from sensor 24) is outside upper and lower limit values stored in memory for the pending shift. If the slip speed ratio is outside these limits, output clutch slip is deemed to be occurring and the valve current value, SlipPoint, at that time is recorded in step 320 and the algorithm proceeds to step 322. This SlipPoint value will depend upon and represent an actual torque load on the transmission 14 and will not include torque loads on other components, such as a power take off (PTO).

If the slip speed ratio is not outside these limits, it is deemed that clutch M is still locked up and that its pressure needs to be further reduced, and step 316 directs the algorithm to step 318 which reduces the valve current applied to clutch M control valve (not shown) by a predetermined increment. Overtime, multiple executions of step 318 will gradually reduce the valve current and reduce the pressure in clutch M.

Step 322 calculates new EngineLoadNumber by inserting the most recently determined Slip value into either equation (1) or (2), whichever was ultimately used, and manipulating the equation (1) or (2) to solve for EngineLoadNumber. This step permits the system to distinguish between power going through the PST 14 or power going through some other device, such as a power take off shaft (not shown). By solving for EngineLoadNumber, the system determines exactly what load condition the PST 14 is operating under and this makes possible a precise and accurate shift control, such as when controlling the pressurization of on-coming clutches.

Based upon the slip point of clutch M, a parasitic-influenced pressure step valve current value $Step_{Low}$ is calculated at step 324 using the following equation:

$$Step_{Low}=((Step_2-Step_1)/(Slip_2-Slip_1) \times SlipPoint) + (Step_2-((Step_2-Step_1)/(Slip_2-Slip_1) \times Slip_2)), \quad (3)$$

where $Step_1$ is an empirically determined stored pressure step value for an unloaded condition of clutch M, $Step_2$ is an empirically determined stored pressure step value for a partially loaded condition of clutch M, $Slip_1$ and $Slip_2$ are as previously described, and SlipPoint is the valve current value stored at step 320 at the time step 316 detects that a slip condition exists. Thus, step 324 computes the current value which corresponds to a pressure step which will be applied to the slipping clutch M. This pressure step is such that clutch M will maintain its original static torque level in the new dynamic state, due to differences in static and dynamic friction. It is intended that equation (3) be used only when the PST 14 is subject to significant parasitic drag forces.

Based upon the slip point of clutch M, the non parasitic-influenced pressure step valve current value, $Step_{High}$, is calculated at step 326 using the following equation:

$$Step_{High}=((Step_3-Step_2)/(Slip_3-Slip_2) \times SlipPoint) + (Step_3-((Step_3-Step_2)/(Slip_3-Slip_2) \times Slip_3)), \quad (4)$$

where $Step_3$ is an empirically determined stored pressure step value for a fully loaded condition of clutch M, and $Step_2$, $Slip_2$, $Slip_3$ and SlipPoint are as previously described.

Step 328 compares the slopes of the linear equations (3) and (4) which map off-going clutch M slip point vs. required pressure step. If the slope of Eqn. (3) is greater than the slope of Eqn. (4), then in step 330, then the smaller of $Step_{Low}$ or $Step_{High}$ is chosen as the valve current step value, Step, which when applied would cause clutch M to maintain original static torque level while in a dynamic slip condition. If the slope of Eqn. (3) is less than the slope of Eqn. (4), then in step 332, the larger of $Step_{Low}$ or $Step_{High}$ is chosen as the valve current step value, Step, which when applied would cause clutch M to maintain original static torque level while in a dynamic slip condition. The intersection of these two equations could again be defined as the point at which parasitic transmission torque loads are no longer significant compared to torque loads created by external operating conditions such as draft. Equation (3) describes clutch M step requirements in the parasitic region while Equation (4) describes clutch M step requirements in the lightly to fully loaded region.

In step 336 the newly computed Step pressure value from either steps 330 or 332 is applied to the clutch M control valve, and the pressure in the clutch M is adjusted accordingly in order to maintain original static torque capacity in the dynamic mode. Finally, In step 338 all on-coming clutches are filled.

Thus, to summarize, the system described herein comprises a method of controlling an off-going clutch during a shift of a powershift transmission of an engine-driven vehicle and sensing actual transmission load, wherein step 303 operates to detect the load on the engine, and step 304 or 306 determines, as a function of the detected engine load, a slip pressure, which when applied to said clutch would cause the clutch to slip. Step 310 or 312 applies the slip pressure to the clutch. Step 316 determines whether the clutch is slipping. Steps 314–318 operate, if the clutch is not slipping, to reduce the pressure applied to the clutch until the clutch begins to slip. Step 322 determines the portion of the engine load passed through the transmission output shaft based upon the pressure value at which the clutch began to slip. Steps 324–332 determine a pressure increase, which when applied to said slipping clutch would allow said slipping to continue to slip while transmitting the same torque it was transmitting before it began to slip. Step 336 applies this determined pressure increase to the slipping clutch. As a result of this algorithm, the PST 14 is set up to perform the rest of the shift, the exact transmission power level is known, and the operator is assured of a smooth shift because original torque levels are maintained in a dynamic friction condition.

Figure 4:
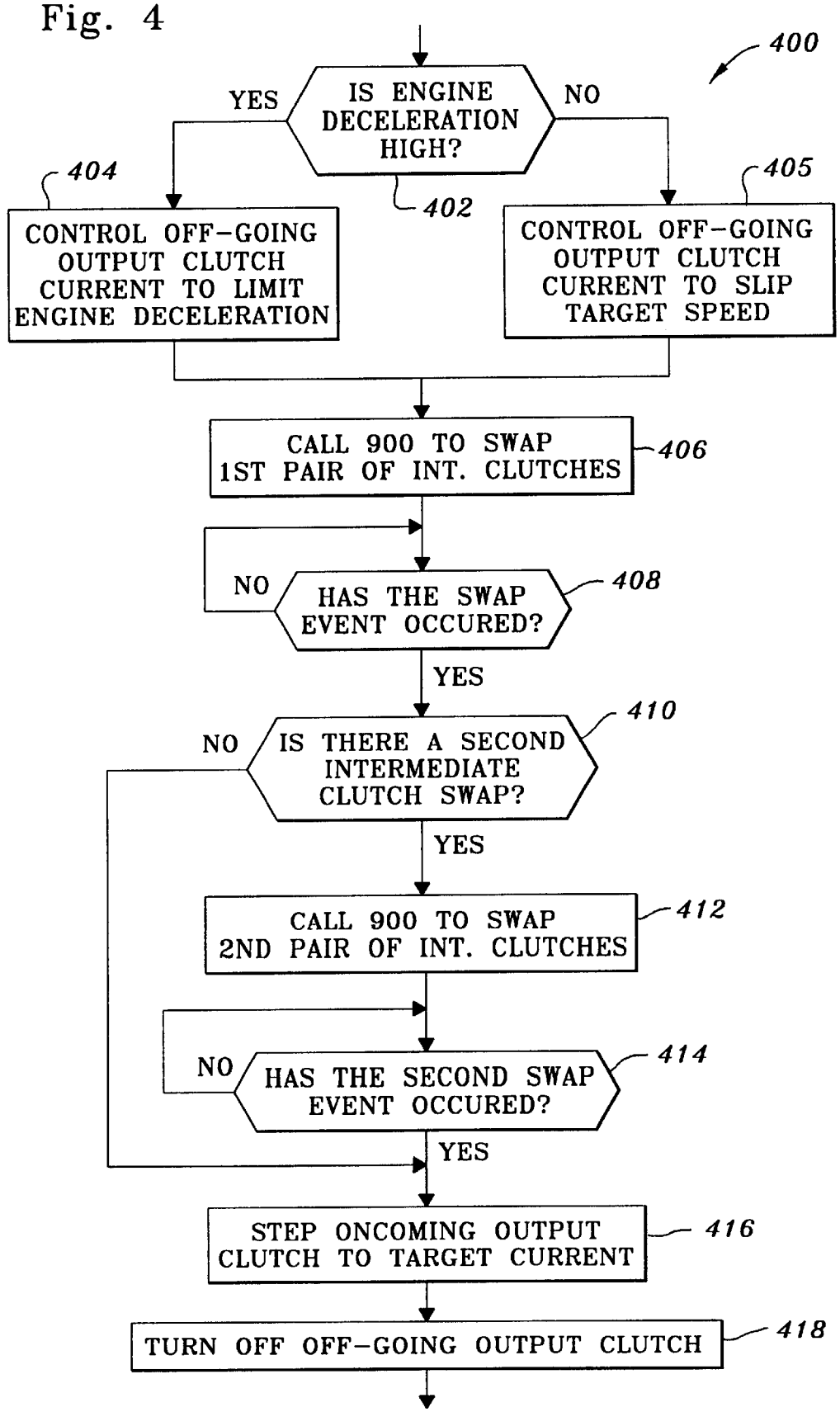

Referring now to FIG. 4, the energy in, upshift routine 400 is executed when the upshift shift being commanded is such that the speed of the input section of the transmission increases during the shift. Routine 400 operates as follows.

Step 402 determines if the engine deceleration is high. If yes, step 404 controls the current of the off-going clutch to limit the deceleration of the engine speed to desired limits, by using a well known PID (Proportional, Integral, Derivative) feedback control routine. If no, step 405 controls the current of the off-going clutch so that the speed of the transmission output shaft will be maintained at the speed which it had when the slip target current was determined.

Step 406 then calls subroutine 900 to thereby swap the first pair of intermediate clutches which are required to be swapped for the shift being performed. Step 408 delays further operation until the swap has been performed.

If no further clutch swap is to be performed, step 410 directs control to step 416. Otherwise step 412 then calls subroutine 900 to thereby swap the second pair of intermediate clutches which are required to be swapped for the shift being performed, and step 414 delays further operation until the second swap has been performed.

Step 416 steps the current of the on-coming output clutch to the target current, and step 418 turns off the off-going output clutch.

Figure 5:
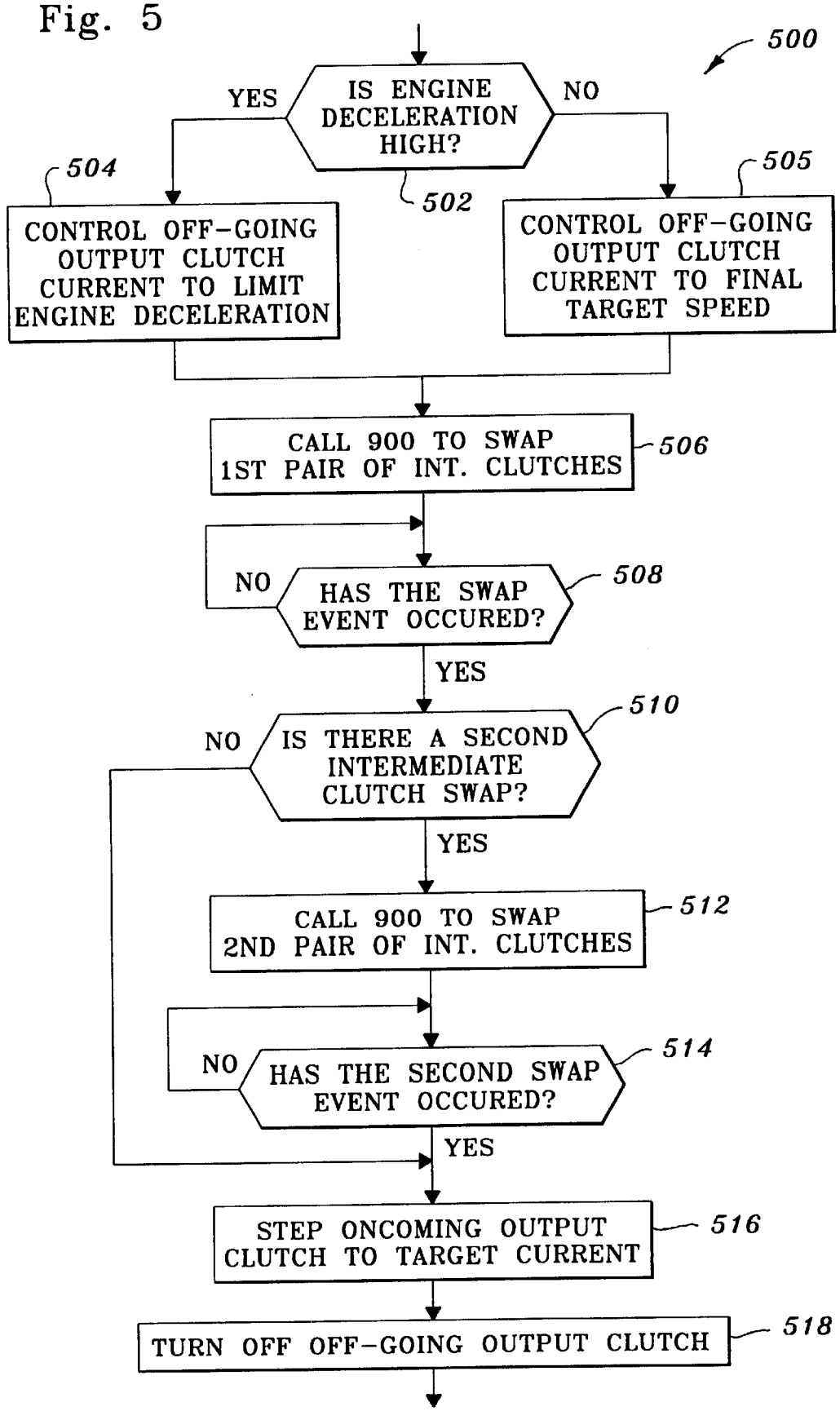

Referring now to FIG. 5, the energy in, downshift routine 500 is executed when the downshift being commanded is such that the speed of the input section of the transmission increases during the downshift. Routine 500 operates as follows.

Step 502 determines if the engine deceleration is high. If yes, step 504 controls the current of the off-going clutch to limit the deceleration of the engine speed to desired limits. If no, step 505 controls the current of the off-going clutch so that the monitored ratio of input speed to output speed equals the final desired ratio of input speed to output speed.

Step 506 then calls subroutine 900 to thereby swap the first pair of intermediate clutches which are required to be swapped for the shift being performed. Step 508 delays further operation until the swap has been performed.

If no further clutch swap is to be performed, step 510 directs control to step 516. Otherwise step 512 then calls subroutine 900 to thereby swap the second pair of intermediate clutches which are required to be swapped for the shift being performed, and step 514 delays further operation until the second swap has been performed.

Step 516 steps the current of the on-coming output clutch to the target current, and step 518 turns off the off-going output clutch.

Figure 6:
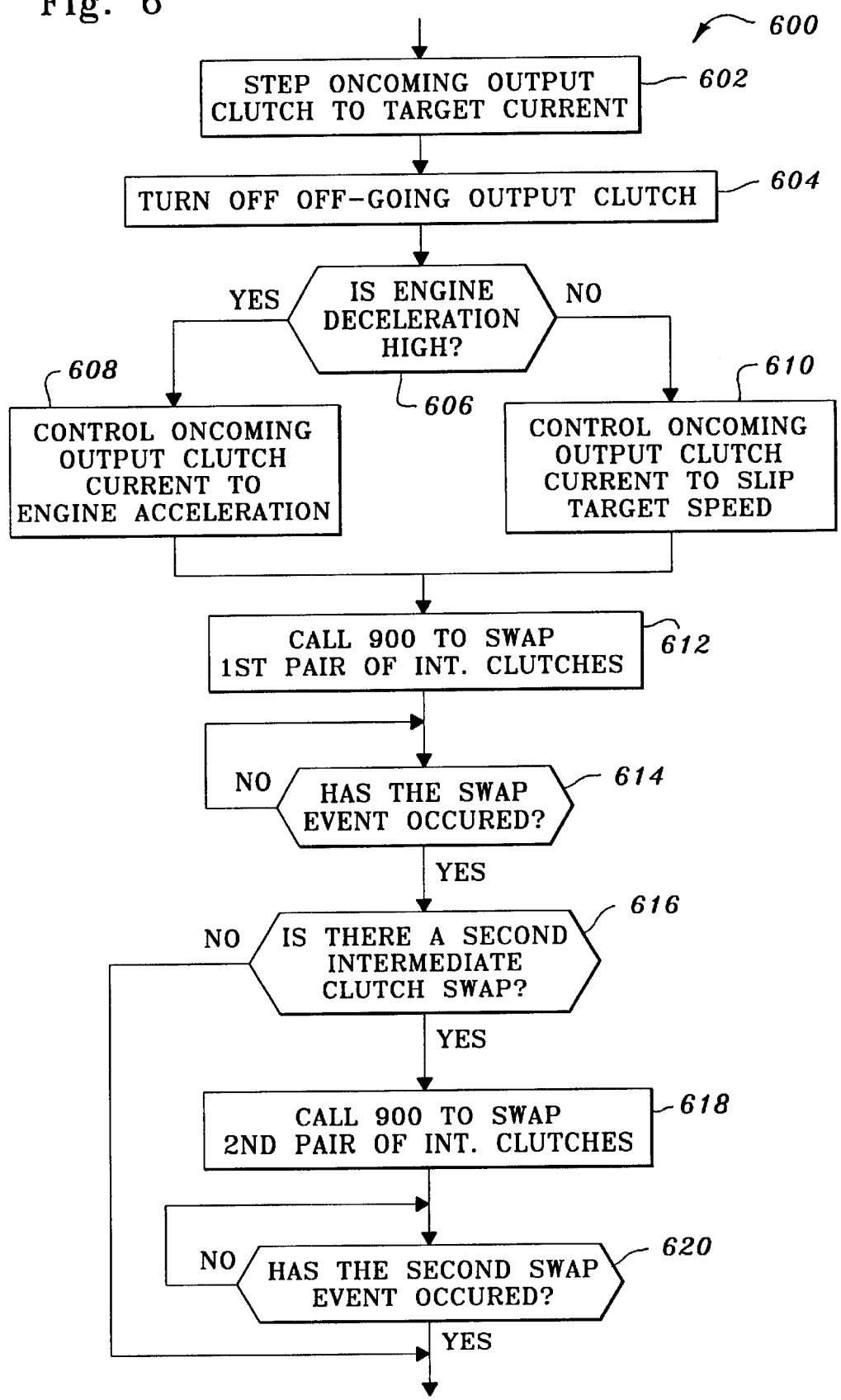

Referring now to FIG. 6, the energy out, upshift routine 600 is executed when the upshift being commanded is such that the speed of the input section of the transmission decreases during the upshift. Routine 600 operates as follows.

Step 602 steps the current of the on-coming output clutch to a target current, and step 604 turns off the off-going output clutch.

Step 606 determines if the engine deceleration is high. If yes, step 608 controls the current of the on-coming output clutch to limit the deceleration of the engine speed to desired limits. If no, step 610 controls the current of the on-coming output clutch so that the speed of the transmission output shaft will be maintained at the speed which it had when the slip target current was determined.

Step 612 then calls subroutine 900 to thereby swap the first pair of intermediate clutches which are required to be swapped for the shift being performed. Step 614 delays further operation until the swap has been performed.

If no further clutch swap is to be performed, step 616 directs control to exit the routine 600. Otherwise step 618 then calls subroutine 900 to thereby swap the second pair of intermediate clutches which are required to be swapped for the shift being performed, and step 620 delays further operation until the second swap has been performed, after which routine 600 is exited.

Figure 7:
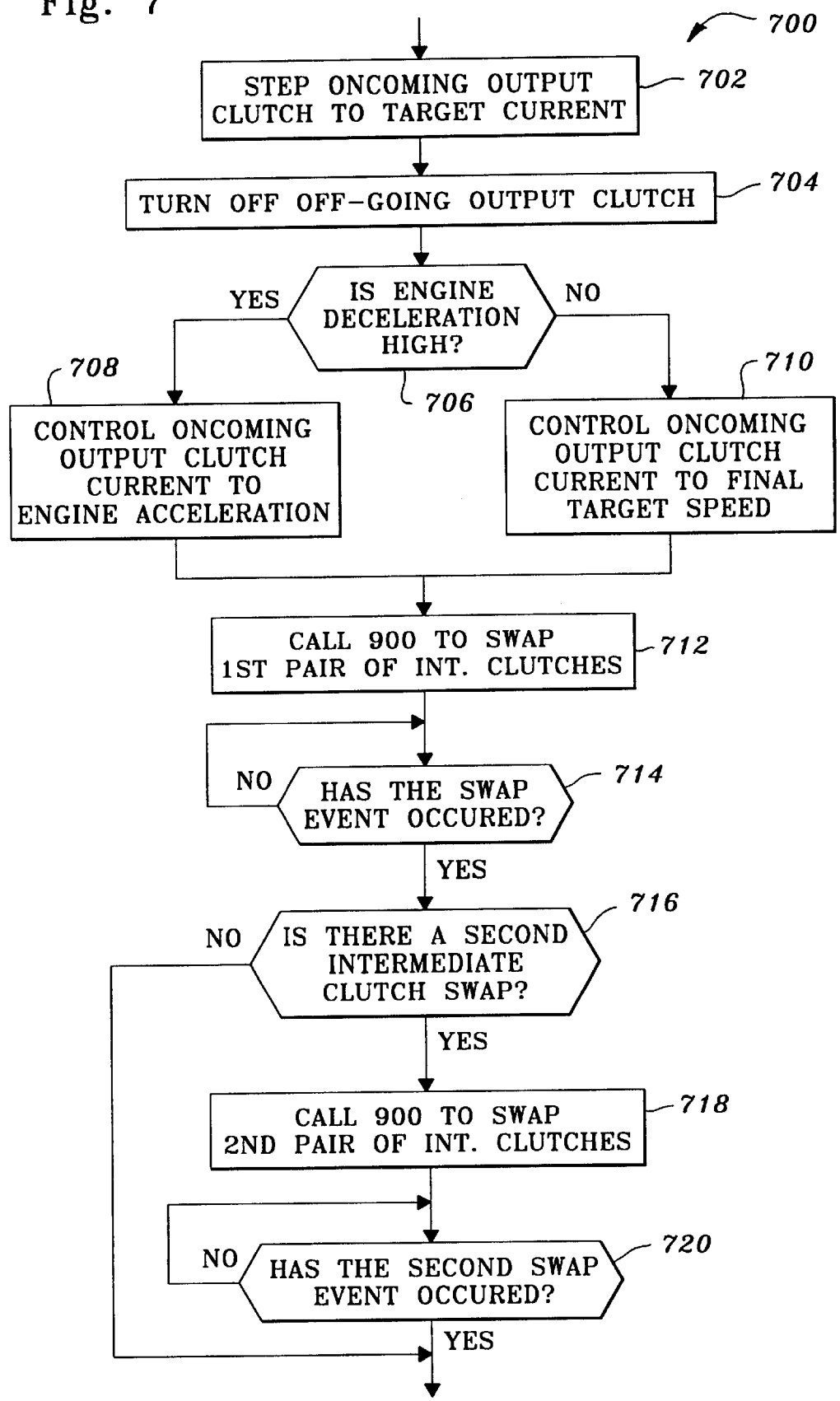

Referring now to FIG. 7, the energy out, downshift routine 700 is executed when the downshift being commanded is such that the speed of the input section of the transmission decreases during the downshift. Routine 700 operates as follows.

Step 702 steps the current of the on-coming output clutch to a target current, and step 704 turns off the off-going output clutch.

Step 706 determines if the engine deceleration is high. If yes, step 708 controls the current of the on-coming output clutch to limit the deceleration of the engine speed to desired limits. If no, step 710 controls the current of the on-coming output clutch so that the monitored ratio of input speed to output speed equals the final desired ratio of input speed to output speed.

Step 712 then calls subroutine 900 to thereby swap the first pair of intermediate clutches which are required to be swapped for the shift being performed. Step 714 delays further operation until the swap has been performed.

If no further clutch swap is to be performed, step 716 directs control to exit the routine 700. Otherwise step 718 then calls subroutine 900 to thereby swap the second pair of intermediate clutches which are required to be swapped for the shift being performed, and step 720 delays further operation until the second swap has been performed, after which routine 700 is exited.

Figure 8:
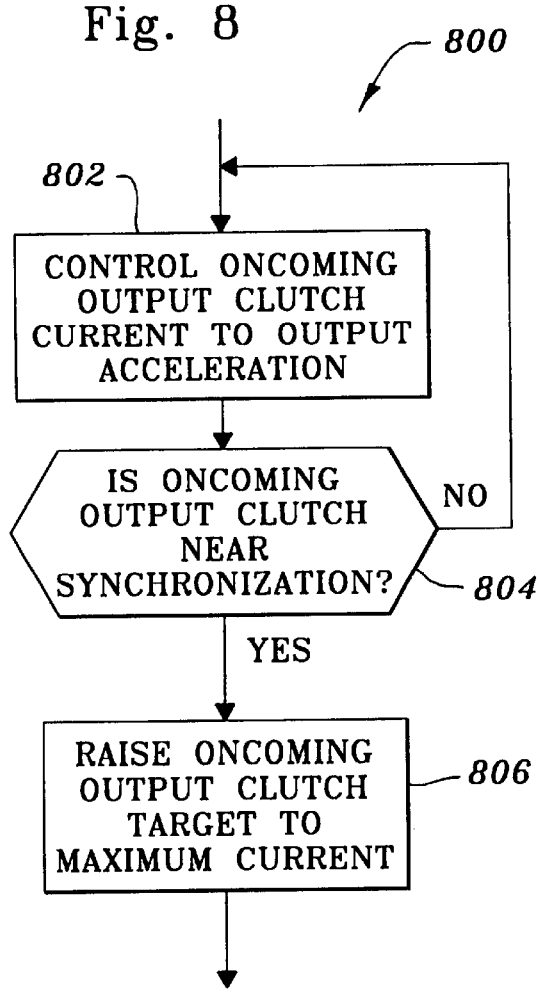

Referring to FIG. 8, routine 800 controls the current of the on-coming output clutch to complete the shift. Step 802 controls the current of the on-coming output clutch to limit the acceleration of the transmission output shaft 16. If the on-coming output clutch is not nearly synchronized, step 804 returns control to step 802. If the on-coming output clutch is nearly synchronized, step 804 directs control to step 806 which raises the target current for the on-coming output clutch to a maximum value.

Figure 9:
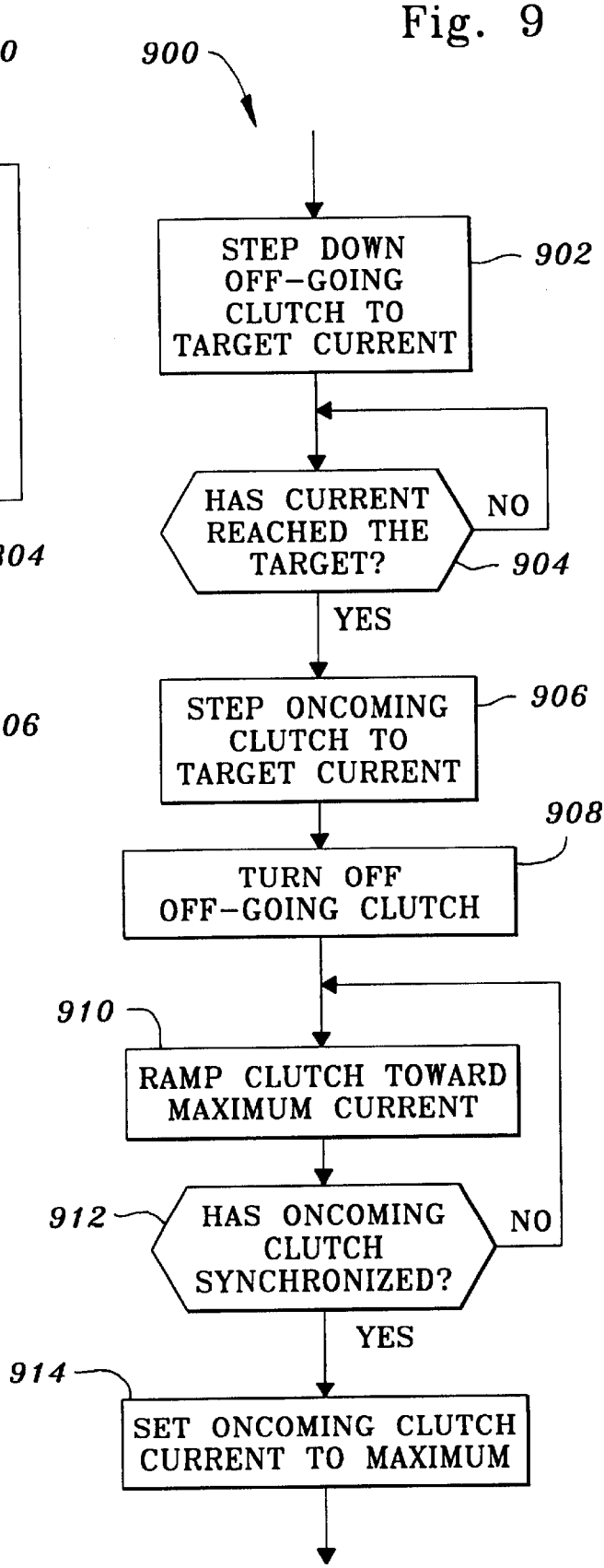

Referring to FIG. 9, routine 900 operates when called by other portions of the routine and controls swapping of clutches necessary to achieve a shift. Step 902 steps down the current of the off-going clutch to a target current value. Step 904 prevents further execution until the off-going clutch current has been reduced to the target value. Step 906 steps the current of the on-coming clutch to a target current value. Step 908 turns off the off-going clutch. Step 910 ramps the current of the on-coming clutch up to a maximum value. Step 912 causes step 910 to repeat until the on-coming clutch is synchronized by comparing a sensed speed ratio to stored speed ratio. Then, step 914 sets the current of the on-coming clutch to a maximum value.

If the input section speeds up during a particular shift, it is termed an energy-in shift and the speed clutches will be swapped before the output clutches, thus slipping the off-going output clutch the majority of the shift. If the input section slows down during a particular shift, it is termed an energy-out shift and the output clutches will be swapped before the speed clutches, thus slipping the on-coming output clutch the majority of the shift. Thus there are four combinations of gear to gear shifts: Energy-in upshift, energy-out upshift, energy-in downshift, and energy-out downshift.

The following is an example of the operation of a particular shift of the transmission 14, an F12 to F13 shift, which is an energy in shift which requires three clutch swaps involving clutches 1, 2, A, C, H and M, as indicated as follows:

| 1 | | A | | H | --F12 |
|---|---|---|---|---|---|
| ↓ | | | | | |
| 2 | | A | | H | --F14 |
| | | ↓ | | | |
| 2 | | C | | H | --F18 |
| | | | | ↓ | |
| 2 | | C | | M | --F13 |

First, engine load is read in step 303. Steps 304–312 calculate an estimated current at which clutch H will slip according to an appropriate stored slip vs. load curve. Steps 324–332 operate to step clutch H to an estimated slip current and begin ramping off clutch H at a predetermined rate until slip of clutch H is detected. Slip is deemed to occur when the actively monitored ratio of output speed (sensed by sensor 30) to $5^{th}$ stage speed (sensed by sensor 28) is outside a range defined in stored shift table arrays for this shift. Steps 324–332 then operate to step clutch H current according to a stored step vs. slip curve as function of slip current. Then step 338 operates to fill clutches 2, C and M.

Step 902 steps clutch 1 down to a current calculated in step 334 by multiplying the calculated step current of clutch H by the ratio between clutches H and 1 (greater than 1). When step 904 determines that clutch 1 has reached its calculated target current, step 906 steps clutch 2 up to a current calculated by multiplying the calculated step current of clutch 1 by the ratio between clutches 1 and 2 (equals 1 for this shift), and step 910 ramps up clutch 2 at a predetermined rate. After a predetermined overlap period, step 908 drops clutch 1 to minimum current.

When the actively monitored ratio of cylinder (3rd stage) speed (sensed by sensor 26) to input speed (sensed by sensor 24) is within a range defined in the shift table arrays, the clutch 1 to 2 swap is deemed to be complete and step 408 permits the next swap to begin. Step 912 raises clutch 2 to its maximum current. Step 410 and subroutine 900 operate to step clutch A down to current calculated by multiplying the calculated step current of clutch H by the ratio between clutches H and A (greater than 1). When step 904 determines that clutch A has reached its calculated target current, step 906 step clutch C up to a current calculated by multiplying the calculated step current of clutch A by the ratio between clutches A and C (greater than 1), and step 910 ramps up clutch C at a predetermined rate. After a predetermined overlap period, step 908 drops clutch A to a minimum current. When the actively monitored ratio of 5th stage speed (sensed by sensor 28) to input speed (sensed by sensor 24) is within a range defined in stored shift table arrays, steps 414 and 912 determine that the clutch A to C swap is complete and permit the output clutch swap to begin, and step 914 raises clutch C to maximum current. Step 416 operates to step clutch M to a current calculated by multiplying the calculated step current of clutch H by the ratio between clutches H and M (less than 1). If the actively monitored ratio of output to input speeds are not within a range defined in the stored shift table arrays, subroutine 800 operates modulate clutch M to lockup (output to input ratio within specified range) by acceleration feed back of monitored output speed. After a predetermined overlap period, step 418 drops clutch H to minimum current. If and when clutch M reaches lockup, step 806 raises clutch M to maximum current.

It should be understood that between the time after the last on-coming clutch is filled (clutches 2, C, M-step 338) up to when the on-coming output clutch M is stepped to its target current (step 416), the off-going output clutch H is controlled in one of the two following modes as a background process. At every program cycle during this time period, step 402 checks to see if the input speed is decelerating more than a predetermined rate. If yes, the off-going output clutch H is controlled in a feedback routine, step 404, which effectively decreases the clutch H current using input speed as the feedback, thereby reducing the torque capacity of clutch H, and in the end, decreasing the load on the engine so that the input speed will decelerate at a rate equal to or less than the predetermined rate. Thus, as a result of this portion of the algorithm, the transmission output speed will decrease, but the input speed will not decelerate faster than desirable.

If the answer to step 402 is no, the off-going output clutch H is controlled in a feedback routine, step 405, which will act to maintain transmission output speed as a predetermined percentage of the output speed at the time slip was detected (step 316) using the output speed as feedback. During step 405, during each program cycle, if output speed is less than the target speed, the clutch H current will be controlled such that the torque capacity of clutch H is increased sufficiently to raise output speed to the target speed. If output speed is greater than the target, the clutch H current will be controlled such that the torque capacity of clutch H is reduced sufficiently to allow output speed to fall to the target speed.

The use of steps 402–405 allows the algorithm to find the optimum balance between allowable input speed drop and the maximum output speed that can be maintained. Preferably, well known PID (Proportional, Integral, Derivative) feedback routines are used to control clutches such as in steps 404, 405 and 802.

In some gear to gear shifts of the 3×3×3 geartrain architecture, only the intermediate clutches, or speed clutches, are swapped to complete the shift. However, since the output clutches are directly meshed with the output shaft, it is desirable to slip the output clutch the majority of the shift as in the shifts where the output clutch is swapped. Therefore, two possible scenarios exist for the case where the output clutch is not swapped. If this particular kind of shift is an upshift, the input section will speed up (energy in), and if it is a downshift, the input section will slow down (energy out).

The following is an example of the operation of a particular shift of the transmission 14, an F1 to F2 shift, which is an energy in shift which requires only one pair of clutches to be swapped, 1 and 2. This example does not require the output clutch to be swapped. The sequence is as follows.

| | | | |
|---|---|---|---|
| 1 | A | L | --F1 |
| ↓ | | | |
| 2 | A | L | --F2 |

First, engine load is read in step 303. Steps 304–312 calculate an estimated current at which clutch L will slip according to an appropriate stored slip vs. load curve. Steps 324–332 operate to step clutch L to an estimated slip current and begin ramping off clutch L at a predetermined rate until slip of clutch L is detected. Slip is deemed to occur when the actively monitored ratio of output speed (sensed by sensor 30) to 5th stage speed (sensed by sensor 28) is outside a range defined in stored shift table arrays for this shift. Steps 324–332 then operate to step clutch L current according to a stored step vs. slip curve as function of slip current. Then step 338 operates to fill clutch 2.

Step 902 steps clutch 1 down to a current calculated in step 334 by multiplying the calculated step current of clutch L by the ratio between clutches L and 1 (greater than 1). When step 904 determines that clutch 1 has reached its calculated target current, step 906 steps clutch 2 up to a current calculated by multiplying the calculated step current of clutch 1 by the ratio between clutches 1 and 2 (equals 1 for this shift), and step 910 ramps up clutch 2 at a predetermined rate. After a predetermined overlap period, step 908 drops clutch 1 to minimum current.

When the actively monitored ratio of $5^{th}$ stage speed (sensed by sensor 28) to input speed (sensed by sensor 24) is within a range defined in the shift table arrays, the clutch 1 to 2 swap is deemed to be complete and step 408 confirms the swap has occurred. Step 912 and 914 raise clutch 2 to its maximum current. Since no other intermediate clutch swap is required, step 410 proceeds directly to step 416. However, since no output clutch swap is required, steps 416 and 418 are skipped and the algorithm will proceed to subroutine 800. If the actively monitored ratio of output to input speeds are not within a range defined in the stored shift table arrays, subroutine 800 operates modulate clutch L to lockup (output to input ratio within specified range) by acceleration feed back of monitored output speed. If and when clutch L reaches lockup, step 806 raises clutch L to maximum current.

It should be understood that between the time after the last on-coming clutch is filled (clutch 2-step 338) up to when the clutch 1 to 2 swap is deemed to be complete (step 408), the output clutch L is controlled in one of the two following modes as a background process. At every program cycle during this time period, step 402 checks to see if the input speed is decelerating more than a predetermined rate. If yes, the output clutch L is controlled in a feedback routine, step 404, which effectively decreases the clutch L current using input speed as the feedback, thereby reducing the torque capacity of clutch L, and in the end, decreasing the load on the engine so that the input speed will decelerate at a rate equal to or less than the predetermined rate. Thus, as a result of this portion of the algorithm, the transmission output speed will decrease, but the input speed will not decelerate faster than desirable.

If the answer to step 402 is no, the output clutch L is controlled in a feedback routine, step 405, which will act to maintain transmission output speed as a predetermined percentage of the output speed at the time slip was detected (step 316) using the output speed as feedback. During step 405, during each program cycle, if output speed is less than the target speed, the clutch L current will be controlled such that the torque capacity of clutch L is increased sufficiently to raise output speed to the target speed. If output speed is greater than the target, the clutch L current will be controlled such that the torque capacity of clutch L is reduced sufficiently to allow output speed to fall to the target speed.

The use of steps 402–405 allows the algorithm to find the optimum balance between allowable input speed drop and the maximum output speed that can be maintained. Preferably, well known PID (Proportional, Integral, Derivative) feedback routines are used to control clutches such as in steps 404, 405 and 802.

To begin a shift using event-driven shift control, the shift is commanded from the operator and an engine load number is recorded. Off-going output clutch pressure is stepped down according to this engine load, and slowly ramped down until slip is detected in said output clutch, as described in pending patent application Ser. No. 09/362,233, filed Jul. 26, 1999. This slip point is then used to define the magnitude of the load present at the off-going output clutch. The slip point shall also be used to define the minimum pressure step needed to maintain transmission output torque through the off-going output clutch. This pressure step is applied to the output clutch slipping throughout the majority of the shift, as described above. This pressure step is related to the off-going output clutch slip point. In event-driven shift control, all pressure steps, both down and up, are related back to the original pressure step on the slipping output clutch. Since wet-clutch torque and applied pressure are linearly related, this is done by multiplying the pressure step by the ratios between the respective clutches and the clutch slipping the majority of the shift. All pressures are relative to a calibrated zero for each respective clutch.

If the particular shift is a predetermined energy-in upshift (final input to output ratio is less than initial input to output ratio), once the pressure step has been applied, the off-going clutch shall enter a closed-loop pressure control scheme. This control loop shall maintain the output speed at a predetermined percentage of the speed at the time that slip was detected. Ideally, this allows the off-going output clutch to be in a dynamic slip condition, yet maintains the original torque level at the transmission output shaft. Once the control loop has been entered, the speed clutches may be swapped. First, a pressure is calculated through the ratio between the off-going output clutch and the particular off-going speed clutch. Once it has been determined that the off-going speed clutch pressure has reached its target, a pressure step for the on-coming speed clutch is calculated by multiplying the pressure of the off-going speed clutch by the ratio between the two speed clutches. The step is made, and after a predetermined overlap time period the pressure for the off-going speed clutch drops to zero. The on-coming speed clutch pressure then ramps at a predetermined rate until synchronization of the on-coming speed clutch is detected by monitoring input speed and an intermediate geartrain speed within the input section of the transmission. At that point, the on-coming speed clutch pressure shall immediately go to full pressure. If another speed clutch swap is included in the particular shift, it is done at completion of the first speed clutch swap, in the same manner. During the speed clutch swaps, the output clutch has remained in a control loop to maintain output speed as described above. Once all speed clutch swaps are done, for an energy-in upshift, the output clutches must be swapped. The pressure step is calculated for the on-coming output clutch by multiplying the original pressure step value by the ratio between the two output clutches. The step is made, and after a predetermined overlap time period, the pressure for the off-going output clutch drops to zero. At this point, the on-coming output clutch shall enter a closed-loop pressure control scheme. If the output speed is below target, the control loop shall target a predetermined output speed acceleration rate. If the output speed is above target, the control loop shall target a predetermined output speed deceleration. This control loop shall be termed final control. During final control, input and output speed is monitored to detect near synchronization of the on-coming output clutch. At that point, the control loop is exited and the on-coming output clutch shall immediately go to full pressure. The particular energy-in upshift is complete.

If the particular shift is a predetermined energy-out upshift (final input to output ratio is less than initial input to output ratio), once the pressure step has been applied, the output clutches must be swapped. For an energy-out upshift, the applied pressure step actually relates to the on-coming output clutch. Therefore, the pressure step on the off-going output clutch is back-calculated at the time that slip is detected. The pressure step on the on-coming output clutch is made, and after a predetermined overlap time period, the pressure for the off-going output clutch drops to zero. If deemed necessary, the on-coming output clutch enters a closed-loop pressure control scheme. This control loop shall maintain the output speed at a predetermined percentage of the speed at the time that slip was detected. Again, this allows the on-coming output clutch to remain in a dynamic slip condition, yet maintains the original output torque level at the transmission shaft. The speed clutches may now be swapped according to the same events as in the previous shift scenario. Once all speed clutch swaps are completed, the on-coming output clutch shall exit the previous control loop maintaining original output speed. At this point, the on-coming output clutch shall enter final control. Again, final control for this type of shift behaves in the same manner as the previous scenario. During final control, input and output speed is monitored to detect near synchronization of the on-coming output clutch. At that point, the final control is exited and the on-coming output clutch shall immediately go to full pressure. The particular energy-out upshift is complete.

If the particular shift is a predetermined energy-in downshift (final input to output ratio is more than initial input to output ratio), the scenario is very similar to the previously described energy-in upshift. The event-driven clutch swaps all occur in the same order and manner. The closed-loop scheme maintaining original output speed in the energy-in upshift now becomes a closed-loop scheme targeted at maintaining the desired gear ratio by monitoring input and output speeds and calculating the dynamic ratio between them. This allows output speed to drop until it reaches the desired ratio. Again, the off-going output clutch remains in a dynamic slip condition, yet maintains the desired torque level for the new input to output gear ratio. All speed clutch swaps are then completed as before. Once the speed clutch swaps are complete, the output clutches are swapped in the same manner as in the energy-in upshift, and the on-coming clutch enters final control in the same manner as the previous scenarios. During final control, input and output speed is monitored to detect near synchronization of the on-coming output clutch. At that point, the final control is exited and the on-coming output clutch shall immediately go to full pressure. The particular energy-in downshift is complete.

If the particular shift is a predetermined energy-out downshift (final input to output ratio is more than initial input to output ratio), the scenario is identical to an energy-out upshift.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A method of controlling, in response to a shift command, a commanded shift of a powershift transmission of an engine-driven vehicle, the transmission having an input shaft, an input section and fluid pressure operated clutches for controlling flow of torque through the transmission, including output clutches and speed clutches between the output clutches and the input shaft, and including an off-going output clutch and an on-coming output clutch, the method comprising:

monitoring a speed of a first component of the transmission;

monitoring a speed of a second component of the transmission, the first and second components being selected according to the commanded shift;

monitoring, from the monitored speeds, a speed ratio of a pair of the speed clutches to be swapped;

if the input section will speed up during the commanded shift, swapping said pair of speed clutches;

comparing the monitored speed ratio to a predetermined stored speed ratio value;

after the speed clutches are swapped, swapping a pair of the output clutches when the monitored speed ratio matches the predetermined stored speed ratio;

determining an engine load value in response to the shift command;

stepping down a pressure of the off-going output clutch as a function of the engine load value until said off-going output clutch slips;

determining a slip point load which is present at said off-going output clutch when said off-going output clutch begins to slip;

determining, as a function of the slip point load, a minimum pressure step needed to maintain transmission output torque through the off-going output clutch;

applying said pressure step to the slipping output clutch slipping throughout the majority of the shift; and fully pressurizing the on-coming output clutch to complete the shift.

2. A method of controlling, in response to a shift command, a commanded shift of powershift transmission of an engine-driven vehicle, the transmission having an input shaft, an input section and fluid pressure operated clutches for controlling flow of torque through the transmission, including output clutches and speed clutches between the output clutches and the input shaft, and including an off-going output clutch and an on-coming output clutch, the method comprising:

monitoring a speed of a first component of the transmission;

monitoring a speed of a second component of the transmission, the first and second components being selected according to the commanded shift;

if the input section will slow down during the commanded shift, swapping a pair of the output clutches;

monitoring, from the monitored speeds, a speed ratio of a pair of the speed clutches to be swapped;

swapping said pair of speed clutches;

comparing the monitored speed ratio to a predetermined stored speed ratio value to determine when swapping of the speed clutches is completed;

determining an engine load value in response to the shift command;

stepping down a pressure of the off-going output clutch as a function of the engine load value until said off-going output clutch slips;

determining a slip point load which is present at said off-going output clutch when said off-going output clutch begins to slip;

determining, as a function of the slip point load, a minimum pressure step needed to maintain transmission output torque through the off-going output clutch;

applying said pressure step to the slipping output clutch slipping throughout the majority of the shift; and after the speed clutch swap is complete, controlling pressurization of the on-coming output clutches to complete the shift.

3. A method of controlling, in response to a shift command, a commanded shift of a powershift transmission of an engine-driven vehicle, the transmission having an input shaft, an input section and fluid pressure operated clutches for controlling flow of torque through the transmission, including output clutches and speed clutches between the output clutches and the input shaft, the method comprising:

monitoring a speed of a first component of the transmission;

monitoring a speed of a second component of the transmission, the first and second components being selected according to the commanded shift;

monitoring, from the monitored speeds, a speed ratio of a pair of the speed clutches to be swapped;

if the input section will speed up during the commanded shift, swapping said pair of speed clutches;

comparing the monitored speed ratio to a predetermined stored speed ratio value;

determining an engine load value in response to a shift command;

stepping down a pressure of the output clutch as a function of the engine load value until said output clutch slips;

determining a slip point load which is present at said output clutch when said output clutch begins to slip;

determining, as a function of the slip point load, a minimum pressure step needed to maintain transmission output torque through the output clutch;

applying said pressure step to the slipping output clutch slipping throughout the majority of the shift; and after the speed clutches are swapped, fully pressurizing one of the output clutches to complete the shift.

4. A method of controlling, in response to a shift command, a commanded shift of a powershift transmission of an engine-driven vehicle, the transmission having an input shaft, an input section and fluid pressure operated clutches for controlling flow of torque through the transmission, including output clutches and speed clutches between the output clutches and the input shaft, the method comprising:

monitoring a speed of a first component of the transmission;

monitoring a speed of a second component of the transmission, the first and second components being selected according to the commanded shift;

if the input section will slow down during the commanded shift, monitoring, from the monitored speeds, a speed ratio of a pair of the speed clutches to be swapped;

swapping said pair of speed clutches;

comparing the monitored speed ratio to a predetermined stored speed ratio value to determine when swapping of the speed clutches is completed;

determining an engine load value in response to a shift command;

stepping down a pressure of the output clutch as a function of the engine load value until said output clutch slips;

determining a slip point load which is present at said output clutch when said output clutch begins to slip;

determining, as a function of the slip point load, a minimum pressure step needed to maintain transmission output torque through the output clutch;

applying said pressure step to the slipping output clutch throughout the majority of the shift; and after the speed clutch swap is complete, controlling pressurization of one of the output clutches to complete the shift.

* * * * *